United States Patent
Hung

(10) Patent No.: US 11,054,062 B2
(45) Date of Patent: Jul. 6, 2021

(54) MODULAR WIRE HOLDING DEVICE FOR AN EXTENSION ARM SUPPORT MECHANISM

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 211 days.

(21) Appl. No.: 16/535,418

(22) Filed: Aug. 8, 2019

(65) Prior Publication Data

US 2020/0063896 A1 Feb. 27, 2020

(30) Foreign Application Priority Data

Aug. 21, 2018 (TW) ................................ 107211463

(51) Int. Cl.
*F16L 3/08* (2006.01)
*F16L 3/015* (2006.01)
*H02G 11/00* (2006.01)
*F16M 13/02* (2006.01)

(52) U.S. Cl.
CPC .............. *F16L 3/015* (2013.01); *H02G 11/00* (2013.01); *F16M 13/022* (2013.01); *F16M 2200/066* (2013.01)

(58) Field of Classification Search
CPC ....... F16L 3/015; H02G 11/00; F16M 13/022; F16M 2200/066
USPC ...... 248/70, 65, 71, 73, 74.2, 74.3; 174/68.1
See application file for complete search history.

(56) References Cited

U.S. PATENT DOCUMENTS

| 6,609,691 | B2 * | 8/2003 | Oddsen, Jr. | F16M 11/10 248/278.1 |
| 7,434,769 | B1 * | 10/2008 | May | F16M 11/10 174/68.1 |
| 8,469,323 | B1 * | 6/2013 | Deros | F16M 13/022 248/278.1 |
| 8,794,579 | B2 * | 8/2014 | Sturman | F16M 11/2092 248/284.1 |
| 10,935,179 | B2 * | 3/2021 | Hung | H02G 3/04 |
| 2019/0086022 | A1 * | 3/2019 | Anderson | F16M 11/2014 |
| 2019/0295446 | A1 * | 9/2019 | Hung | F16M 13/02 |
| 2020/0063914 | A1 * | 2/2020 | Hung | F16M 11/046 |
| 2020/0067290 | A1 * | 2/2020 | Hung | F16M 11/048 |

* cited by examiner

*Primary Examiner* — Todd M Epps
(74) *Attorney, Agent, or Firm* — DLA Piper LLP (US)

(57) ABSTRACT

A modular wire holding device for an extension arm support mechanism which includes an extension arm that has a recess includes two side walls configured to be disposed in the recess and spaced apart from each other, a sink wall interconnecting closed side edges of the side walls to define a wire accommodating groove with an access opening, and a holding member extending from one side wall toward the other side wall so as to hold a wire assembly to the wire accommodating groove.

8 Claims, 10 Drawing Sheets

US 11,054,062 B2

MODULAR WIRE HOLDING DEVICE FOR AN EXTENSION ARM SUPPORT MECHANISM

CROSS-REFERENCE TO RELATED APPLICATION

This application claims priority of Taiwanese Patent Application No. 107211463, filed on Aug. 21, 2018.

FIELD

The disclosure relates to an extension arm support mechanism, and more particularly to a modular wire holding device for an extension arm support mechanism.

BACKGROUND

Referring to FIGS. 1 and 2, a conventional extending arm support mechanism 1 for supporting an electronic device 2 (such as a monitor display) which includes a wire assembly 21 to be connected with a power supply is disclosed. The support mechanism 1 includes an extension arm 11 and a hook 12 mounted on the extension arm 11 for gripping a wire assembly 21 or multiple wire assemblies 21 to keep the wire assembly (s) 21 closer to the extension arm 11. However, the hook 12 projecting from the extension arm 11 adversely affects the outer appearance of the support mechanism 1 and is not sufficient to keep the whole wire assembly 21 along the extension arm 11 such that a portion of the wire assembly 21 might interfere with other objects nearby.

SUMMARY

Therefore, an object of the disclosure is to provide a modular wire holding device for an extension arm support mechanism that can alleviate at least one of the drawbacks of the prior art.

According to the disclosure, the modular wire holding device is mountable in an extension arm support mechanism which includes an extension arm that defines therein a channel for accommodating an extension and retraction device. The channel is bordered by a mounting wall which has inner and outer surfaces, and which has a recess that extends from the outer surface toward the inner surface. The modular wire holding device includes two side walls, a sink wall and a holding member. The side walls are configured to be disposed in the recess and to extend normal to the mounting wall, and are spaced apart from each other. Each of the side walls has an opened side edge which is disposed adjacent to and extends parallel to the outer surface of the mounting wall, and a closed side edge which is opposite to the opened side edge and disposed inwardly of the inner surface of the mounting wall. The sink wall has a peripheral edge which interconnects the closed side edges of the side walls to cooperate with the side walls to define a wire accommodating groove with an access opening at the opened side edges of the side walls. The holding member extends from the opened side edge of one of the side walls toward the opened side edge of the other one of the side walls so as to hold a wire assembly to the wire accommodating groove.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
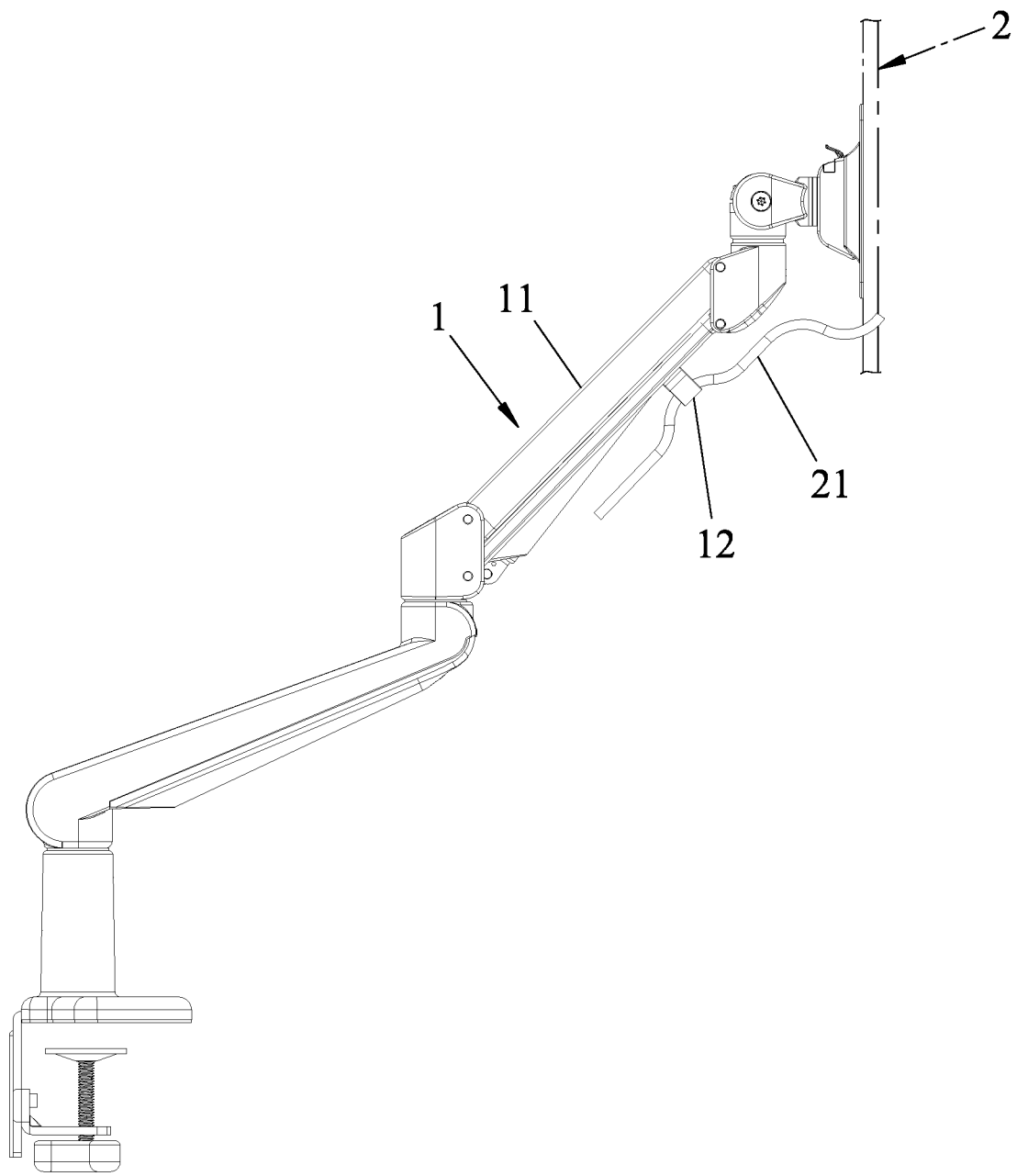
FIG. 1 is a schematic side view of a conventional extension arm support mechanism.
Figure 2:
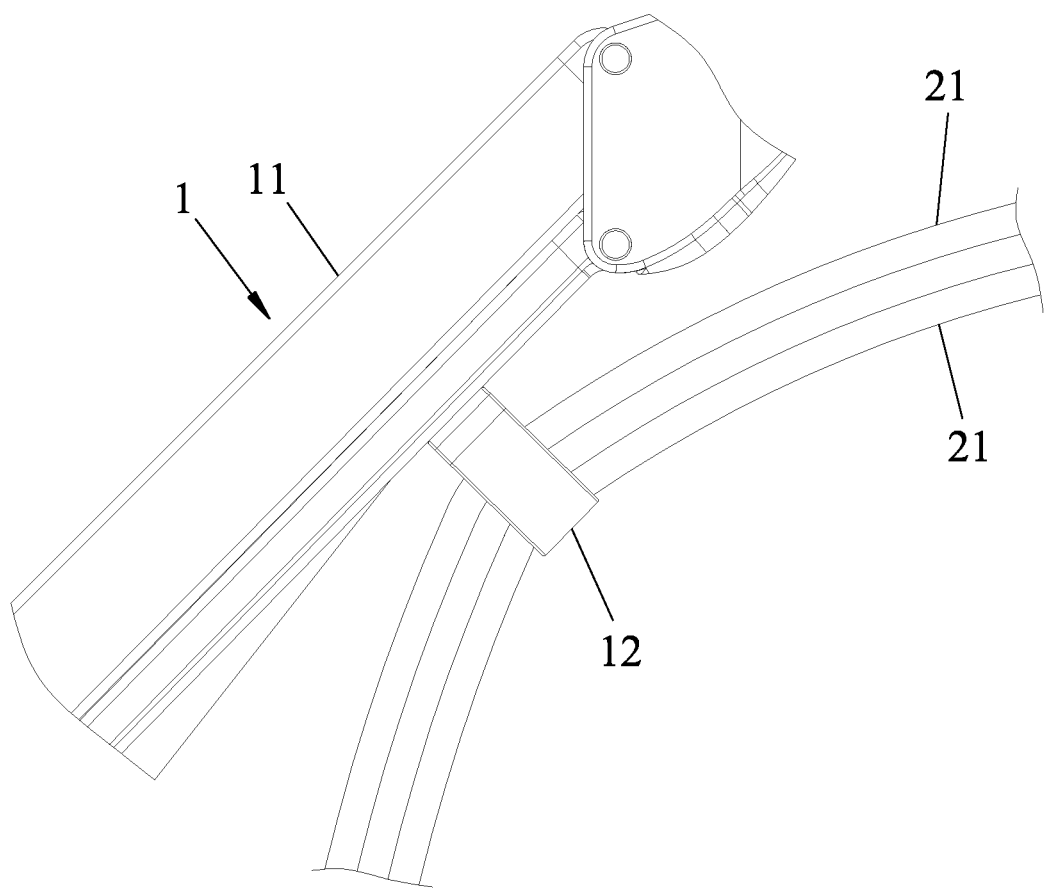
FIG. 2 is a fragmentary enlarged view illustrating a hook of the conventional extension arm support mechanism for holding multiple wire assemblies.
Figure 3:
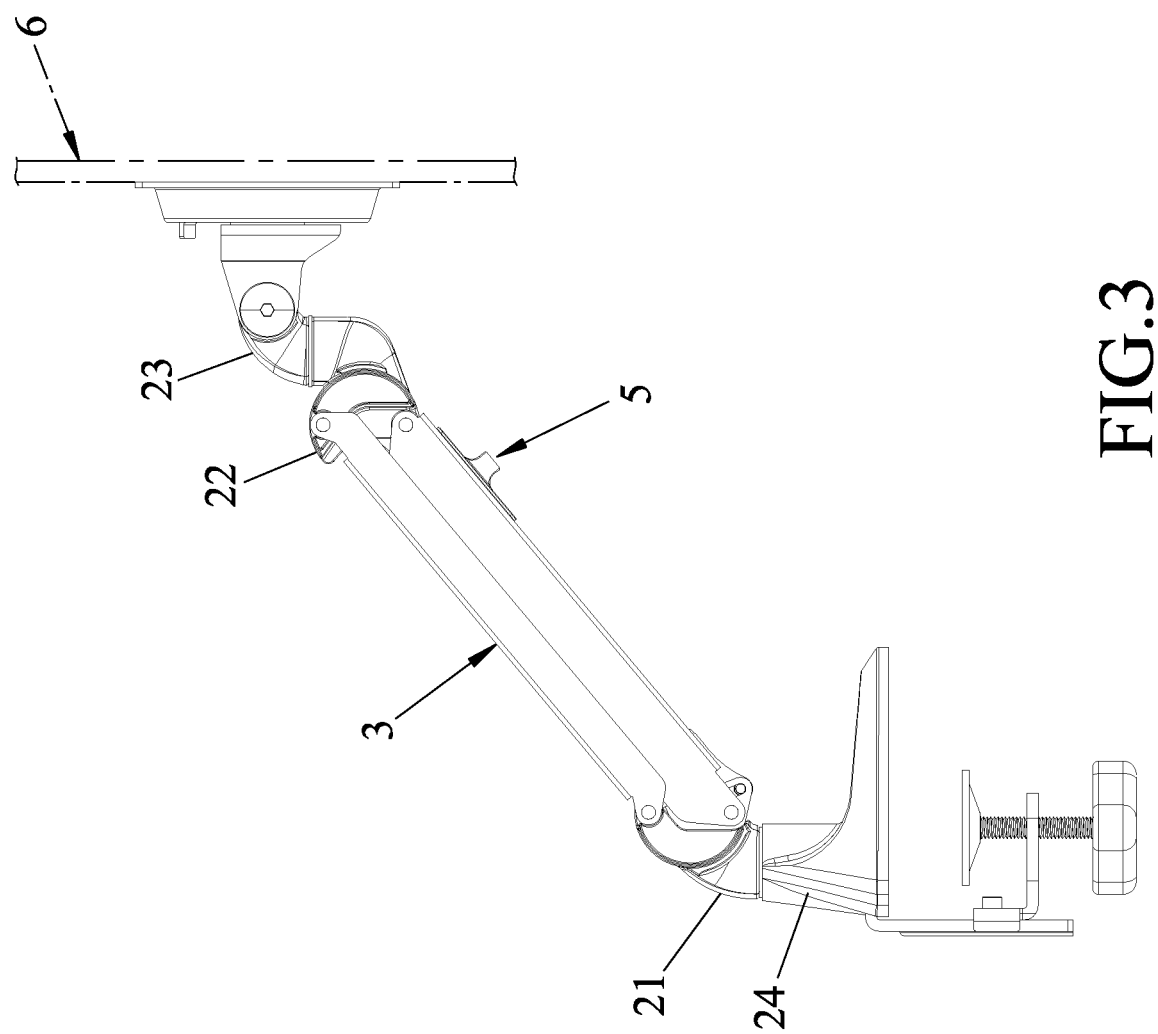
FIG. 3 is a schematic side view illustrating an extension arm support mechanism employed with an embodiment of a modular wire holding device according to the disclosure.
Figure 4:
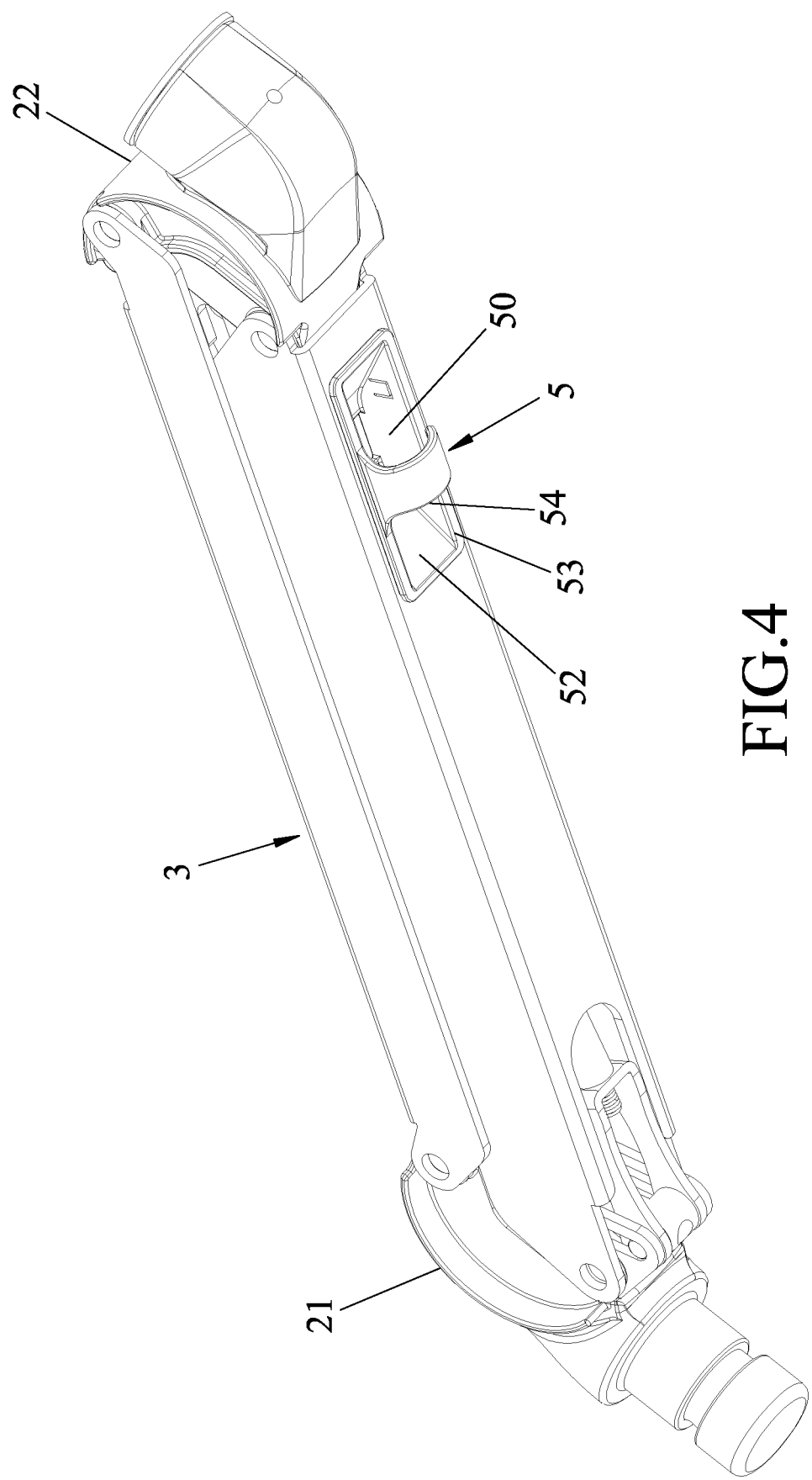
FIG. 4 is a perspective view illustrating the embodiment incorporated in the extension arm support mechanism.

Referring to FIGS. 3 to 6, an embodiment of a modular wire holding device 5 is mountable on an extension arm support mechanism for supporting an electronic device 6. The extension arm support mechanism includes an extension arm 3 that defines therein a channel 30 for accommodating an extension and retraction device 4. The extension arm 3 has two ends pivotably connected to two joint members 21, 22, respectively. The joint member 21 is connected to a mounting member 24 to be affixed to a piece of furniture, such as a desk or a wall. The joint member 22 is connected to a tilting member 23 connectable to the electronic device 6. The electronic device 6 has multiple wire assemblies 61 (with reference to FIG. 10). The channel 30 is bordered by a mounting wall 301 (e.g. a bottom wall in this embodiment) which has inner and outer surfaces 31, 32, and which has a recess 33 that extends from the outer surface 32 toward the inner surface 31. In this embodiment, the recess 33 extends through the inner surface 31 to be communicated with the channel 30.

Figure 8:
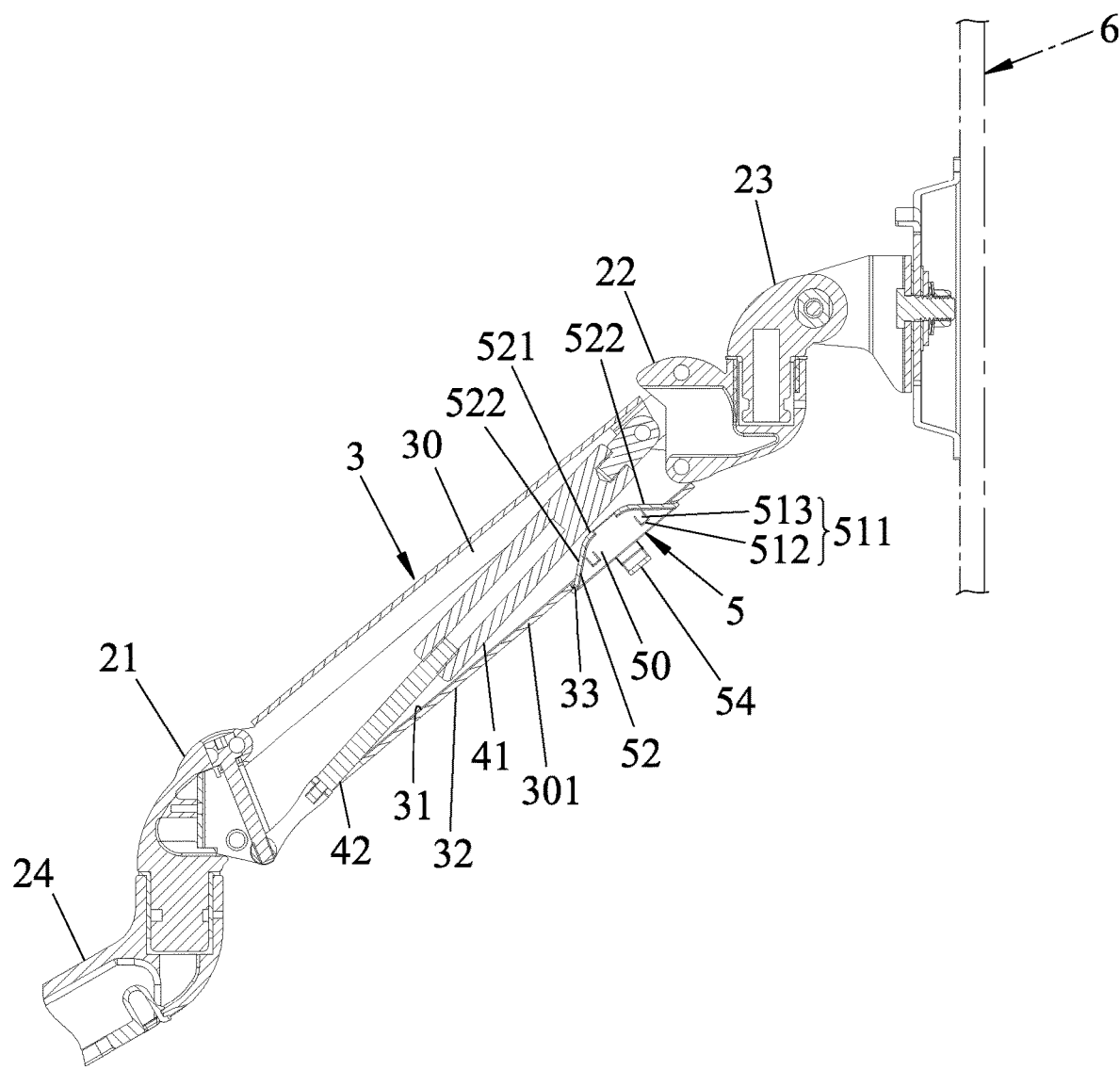
FIG. 8 is a fragmentary sectional view illustrating a state when an extension and retraction device of the extension arm support mechanism is in a first extended position.
Figure 9:
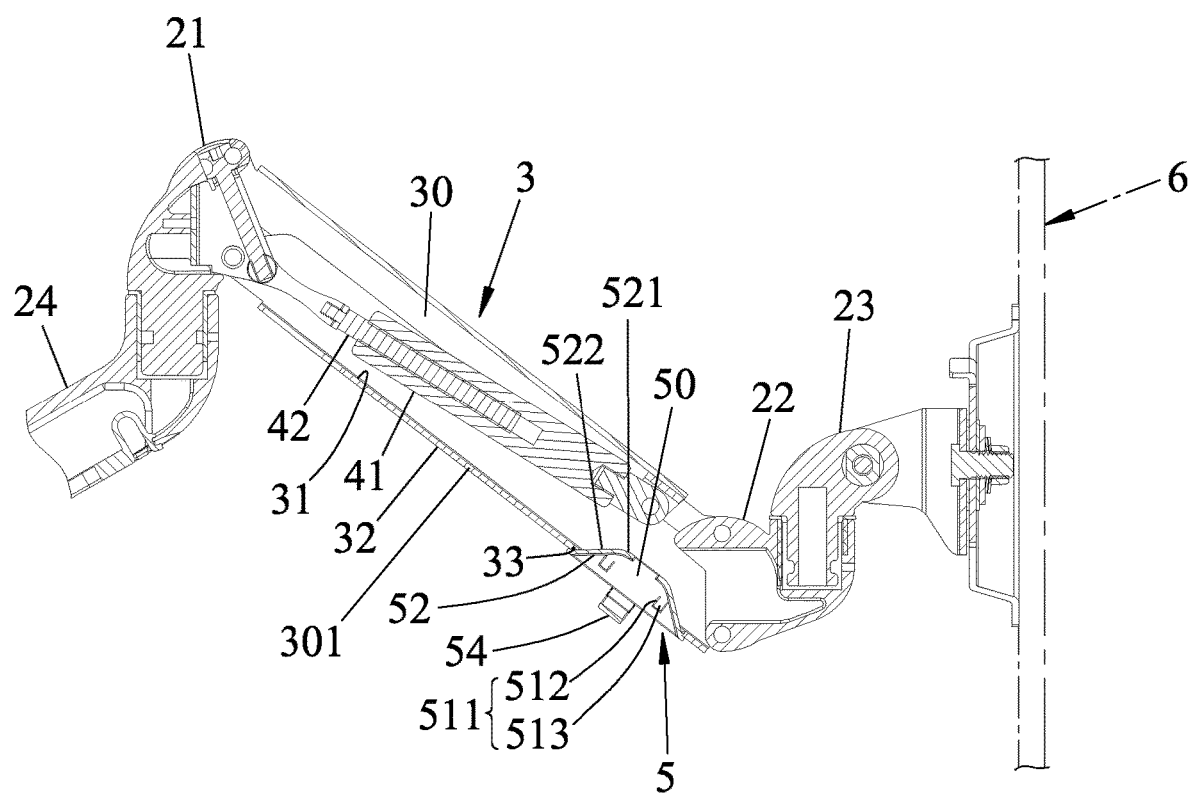
FIG. 9 is a fragmentary sectional view illustrating a state when the extension and retraction device is in a second retracted position.

With reference to FIGS. 8 and 9, the extension and retraction device 4 includes a hydraulic cylinder 41 and a piston 42 movably disposed in the hydraulic cylinder 41. The hydraulic cylinder 41 is pivotably connected to the extension arm 3. The piston 42 is pivotably connected to the joint member 21. Thus, the piston 42 is movable relative to the hydraulic cylinder 41 between a first extended position (see FIG. 8), where the joint member 22 is positioned higher than the joint member 21, and a second retracted position (see FIG. 9), where the joint member 22 is positioned lower than the joint member 21.

Figure 5:
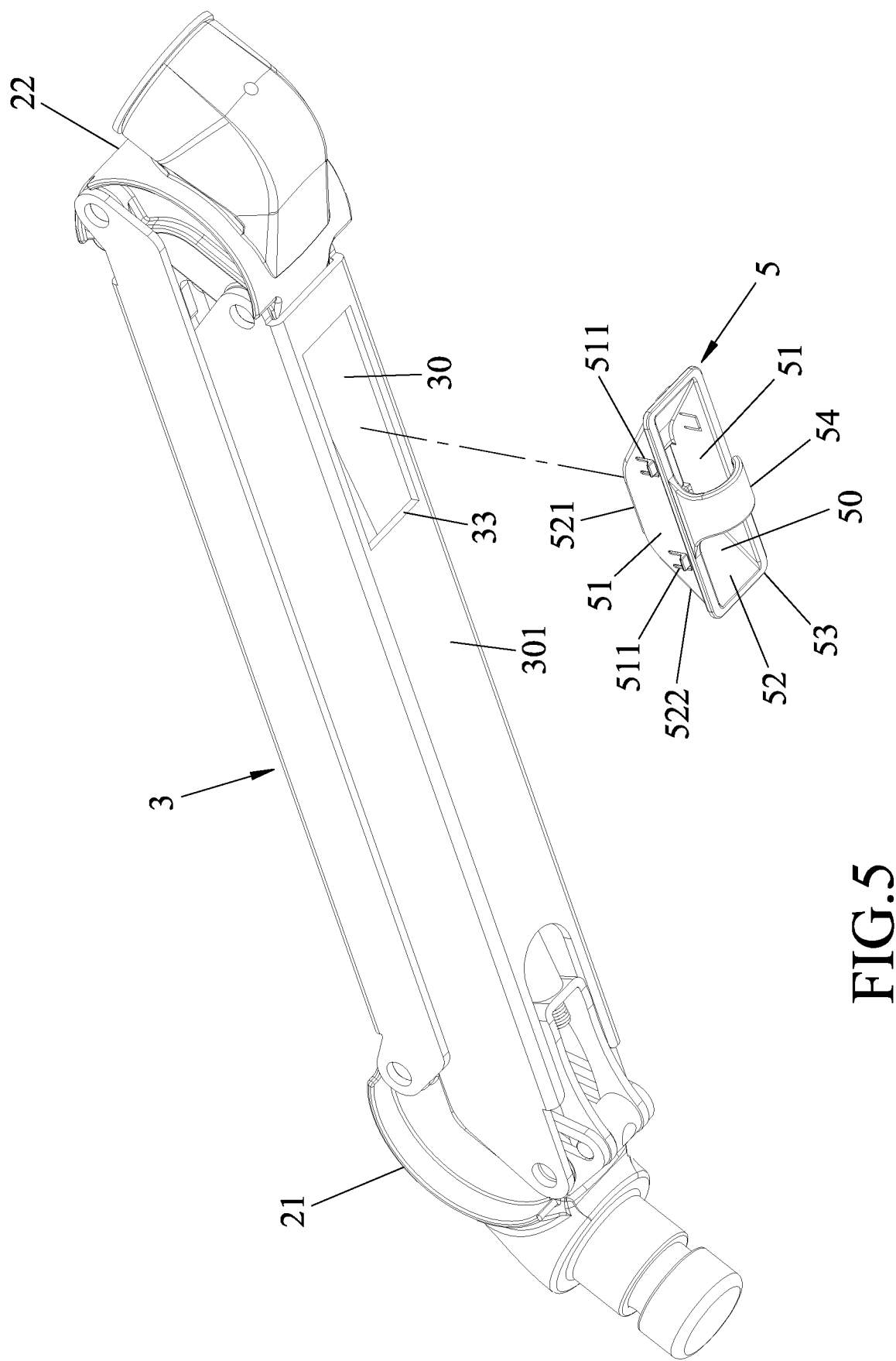
FIG. 5 is a perspective view illustrating the embodiment and the extension arm support mechanism.
Figure 6:
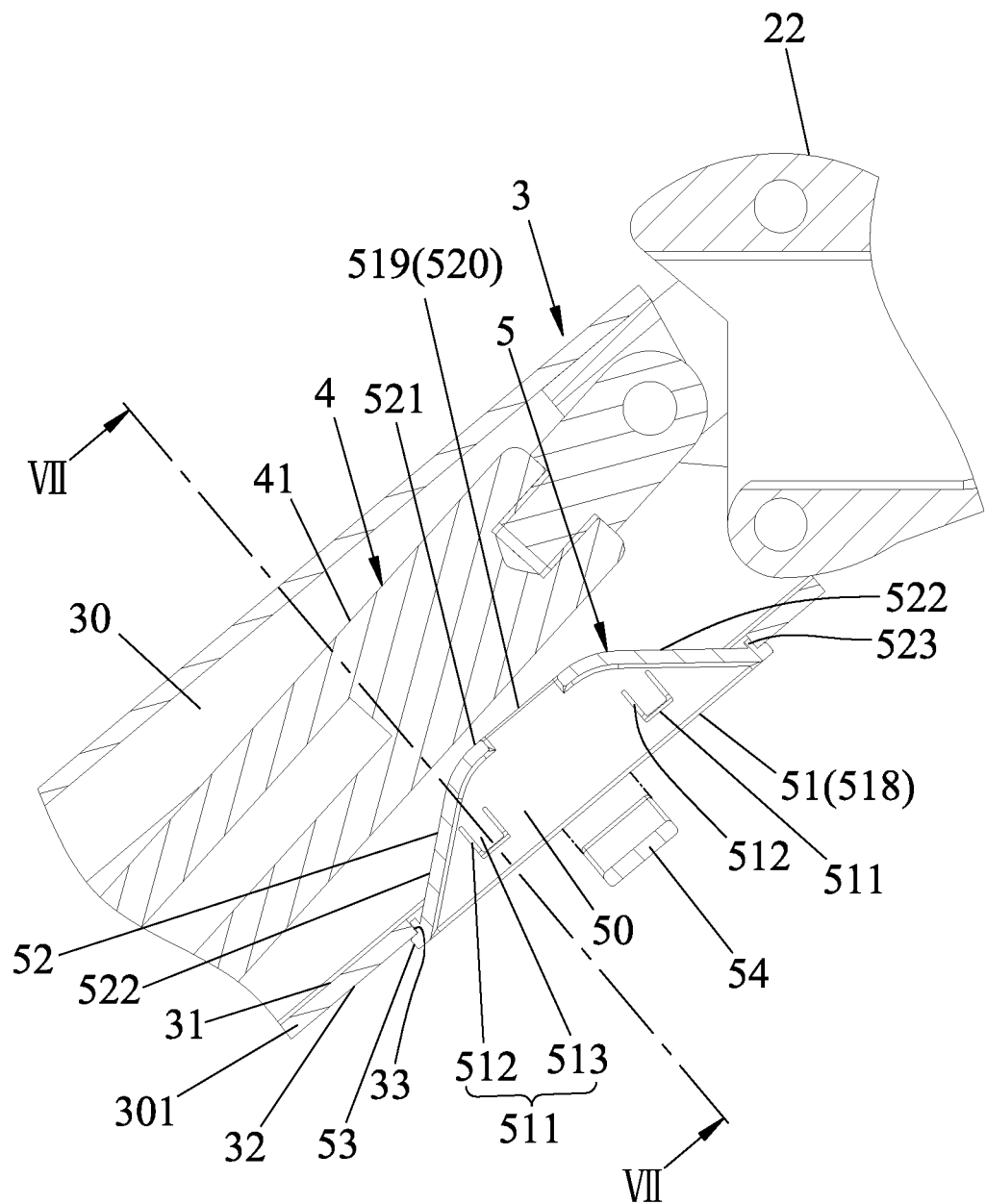
FIG. 6 is a fragmentary sectional view illustrating the embodiment mounted in the extension arm support mechanism.
Figure 7:
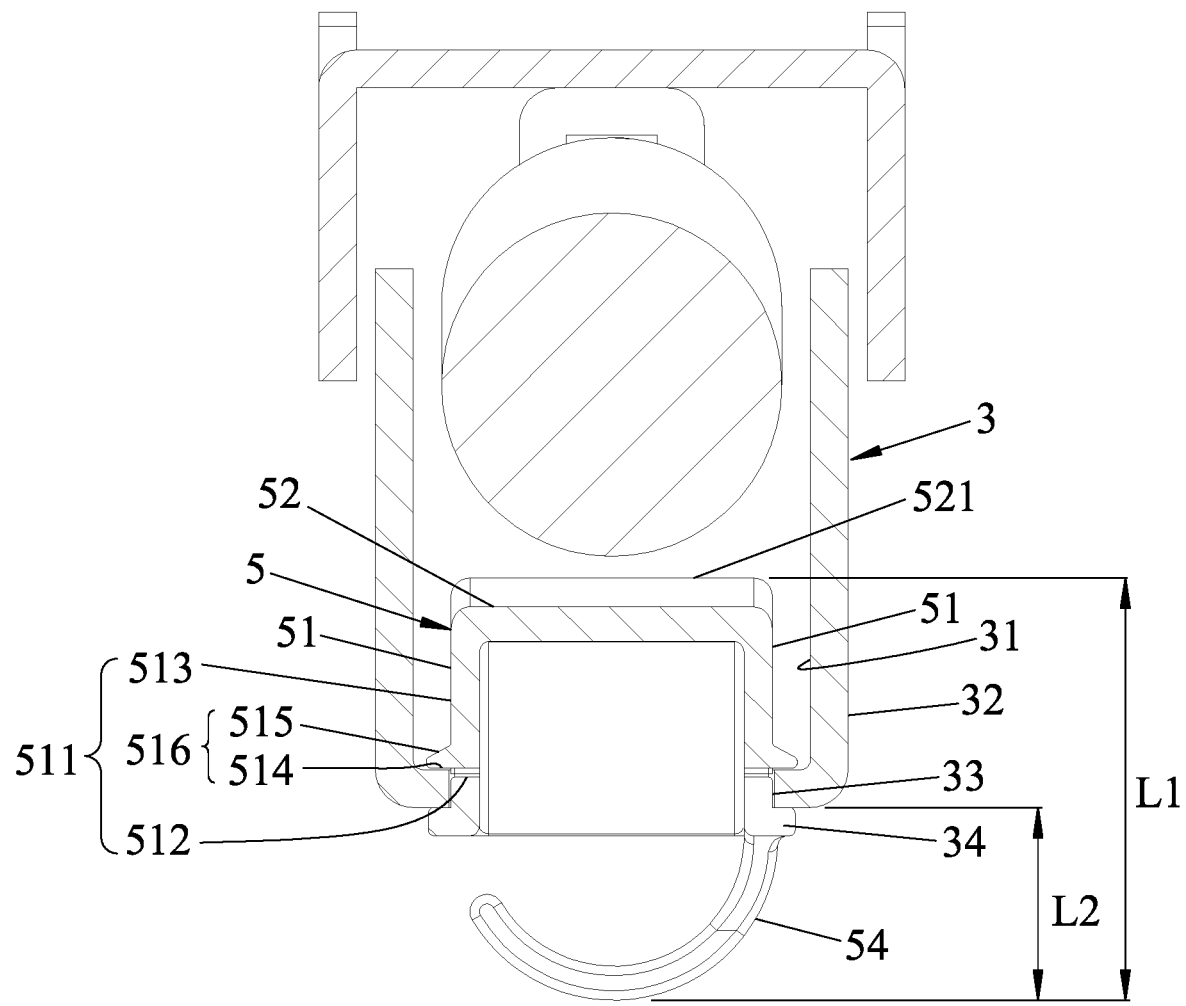
FIG. 7 is a sectional view taken along line VII-VII of FIG. 6.

Referring to FIGS. 5 to 7, the modular wire holding device 5 of the embodiment is made from a plastic material, and is mountable in the recess 33. The modular wire holding device 5 includes two side walls 51, a sink wall 52, an abutment flange 53 and a holding member 54.

The side walls 51 are configured to be disposed in the recess 33 and to extend normal to the mounting wall 301, and are spaced apart from each other. Each of the side walls 51 has an opened side edge 518 which is disposed adjacent to and extends parallel to the outer surface 32 of the mounting wall 301, and a closed side edge 519 which is opposite to the opened side edge 518 and disposed inwardly of the inner surface 31 of the mounting wall 301. Each of the side walls 51 also has two retaining members 511 formed thereon. As shown in FIGS. 6 and 7, each of the retaining members 511 has a U-shaped slit 512 for a resilient flap 513 which is substantially coplanar with the side wall 51 and which has a fixed end integrally connected to the side wall 51, and a free end opposite to the fixed end and formed with a resilient protrusion 516. The resilient protrusion 516 has an abutting wall 514 which is disposed to abut against an internal surface of the extension arm 3, and a guiding wall 515 which extends from and is inclined relative to the abutting wall 514 to define an included angle less than 90 degrees for facilitating insertion of the side walls 51 into the recess 33 to have the abutting wall 514 abutting against the internal surface of the extension arm 3.

The sink wall 52 has a peripheral edge 520 which interconnects the closed side edges 519 of the side walls 51 to cooperate with the side walls 51 to define a wire accommodating groove 50 with an access opening at the opened side edges 518 of the side walls 51. In this embodiment, the sink wall 52 includes a parallel wall segment 521 which is disposed parallel to the mounting wall 301, and two slope wall segments 522 extending from the parallel wall segment 521 to the opened side edges 518 of the side walls 51 and intersecting with the parallel wall segment 521 by an included angle. The included angle is less than 180 degrees.

The abutment flange 53 extends from the opened side edges 518 of the side walls 51 and the sink wall 52 to surround the access opening of the wire accommodation groove 50, and is configured to abut against the outer surface 32 of the mounting wall 301.

The holding member 54 extends from the opened side edge 518 of one side wall 51 toward the opened side edge 518 of the other side wall 51 so as to hold the wire assemblies 61 to the wire accommodating groove 50. In this embodiment, the holding member 54 is connected at an end thereof to the abutment flange 53 on one side wall 51, and is arcuated from the end toward the other side wall 51. The space for accommodating the wire assemblies 61 in this embodiment is defined between a distal portion of the holding member 54 and the parallel wall segment 521 of the sink wall 52, and has a first length (L1) that is larger than a second length (L2) between the distal portion of the holding member 54 and the outer surface 32, by which a space is defined for accommodating the wire assemblies in the prior art.

The sink wall 52 has at least two retaining protrusions 523 (e.g. four retaining protrusions 523 in this embodiment) which are formed on the slope wall segments 522 and adjacent to the abutment flange 53 and which are configured to retainingly engage with an inner surface of the recess 33.

Figure 10:
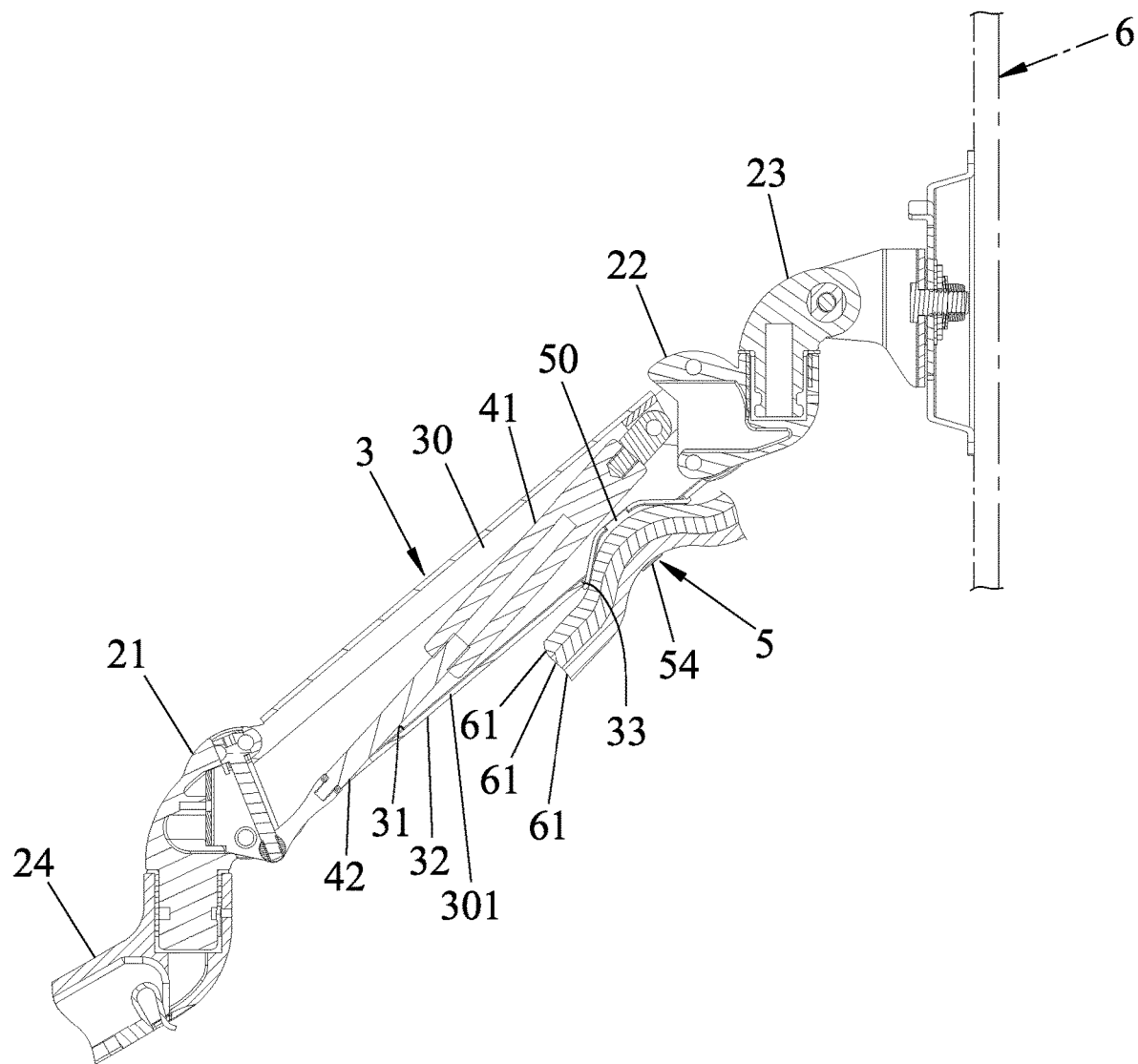
FIG. 10 is a fragmentary sectional view illustrating a state when multiple wire assemblies are held by the embodiment.

With reference to FIGS. 6, 7 and 10, in assembly, the modular wire holding device 5 is inserted into the recess 33 such that the abutting walls 514 of the retaining members 511 abut against the inner surface 31 of the mounting wall 301, the retaining protrusions 523 abut against the inner surface of the recess 33, and the abutment flange 53 abuts against the outer surface 32 of the mounting wall 301 to retain firmly the modular wire holding device 5 to the extension arm 3.

In use, an electronic device 6 is mounted to the tilting member 23, and the wire assemblies 61 of the electronic device 6 extend through the wire accommodation groove 50 to be close to and along the extension arm 3 and are held by the holding member 54 to be prevented from dropping from the wire accommodation groove 50.

With reference to FIGS. 8 to 10, the extension and retraction device 4 is disposed to permit the extension arm 3 to be adjusted and to retain a selected configuration so as to adjust the height and angular position of the electronic device 6. Specifically, the piston 42 of the extension and retraction device 4 is movable relative to the hydraulic cylinder 41 between the first extended position, where the joint member 22 is positioned higher than the joint member 21, and a second retracted position, where the joint member 22 is positioned lower than the joint member 21. With the slope wall segments 522 of the sink wall 52, the wire holding device 5 can be kept spaced apart from the extension and retraction device 4 during the position adjustment of the electronic device 6.

As illustrated, the wire accommodation groove 50 is disposed in the recess 33 so as to increase the space for accommodating the wire assemblies 61. In other words, to accommodate the same number of the wire assemblies 61, the holding member 54 can be reduced in size as compared with that in the prior art. Moreover, part of the wire assemblies 61 is accommodated in the wire accommodation groove 50 disposed in the recess 33 and is biased inwardly toward the recess 33 such that the wire assemblies 61 extend closer to and along the extension arm 3 to enhance the aesthetic appeal of the extension arm support mechanism during use.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A modular wire holding device for an extension arm support mechanism which includes an extension arm that defines therein a channel for accommodating an extension and retraction device, the channel being bordered by a mounting wall which has inner and outer surfaces, and which has a recess that extends from the outer surface toward the inner surface, comprising:
   two side walls configured to be disposed in the recess and to extend normal to the mounting wall, and spaced apart from each other, each of said side walls having an opened side edge which is disposed adjacent to and extends parallel to the outer surface of the mounting wall, and a closed side edge which is opposite to said opened side edge and disposed inwardly of the inner surface of the mounting wall;
   a sink wall having a peripheral edge which interconnects said closed side edges of said side walls to cooperate with said side walls to define a wire accommodating groove with an access opening at said opened side edges of said side walls; and
   a holding member extending from said opened side edge of one of said side walls toward said opened side edge of the other one of said side walls so as to hold a wire assembly to said wire accommodating groove.

2. The modular wire holding device as claimed in claim 1, wherein said sink wall includes a parallel wall segment which is disposed parallel to the mounting wall, and two slope wall segments extending from said parallel wall segment to said opened side edges of said side walls and intersecting with said parallel wall segment by an included angle, said included angle being less than 180 degrees.

3. The modular wire holding device as claimed in claim 2, wherein said parallel wall segment is configured to be spaced apart from the extension and retraction device.

4. The modular wire holding device as claimed in claim 1, wherein each of said side walls has at least one retaining member which has a U-shaped slit for a resilient flap that is substantially coplanar with said side wall and that has a fixed end integrally connected to said side wall, and a free end opposite to said fixed end and formed with a resilient protrusion, said resilient protrusion having an abutting wall which is disposed to abut against the extension arm, and a guiding wall which extends from and is inclined relative to said abutting wall to define an included angle less than 90 degrees for facilitating insertion of said side wall into the recess to have said abutting wall abutting against the extension arm.

5. The modular wire holding device as claimed in claim 4, wherein each of said side walls has two of said retaining members.

6. The modular wire holding device as claimed in claim 5, further comprising an abutment flange which extends from said opened side edges of said side walls and said sink wall to surround said access opening and which is configured to abut against the outer surface of the mounting wall.

7. The modular wire holding device as claimed in claim 6, wherein said holding member is connected to said abutment flange.

8. The modular wire holding device as claimed in claim 6, wherein said sink wall has at least two retaining protrusions which are formed adjacent to said abutment flange and configured to retainingly engage with the recess.

\* \* \* \* \*